United States Patent
Chowdhary et al.

(10) Patent No.: US 11,042,716 B2
(45) Date of Patent: Jun. 22, 2021

(54) SYSTEM FOR SECURING A MAGNETIC CARD READER, CORRESPONDING MAGNETIC CARD READER AND ELECTRONIC DEVICE

(71) Applicant: INGENICO GROUP, Paris (FR)

(72) Inventors: Ferhaj Chowdhary, Jouy-le-Moutier (FR); Johann Balasse, Courbevoie (FR); Ludovic Neveu, Chateau D'Olonne (FR); Alexandre Quenet, Paris (FR)

(73) Assignee: INGENICO GROUP, Paris (FR)

( * ) Notice: Subject to any disclaimer, the term of this patent is extended or adjusted under 35 U.S.C. 154(b) by 83 days.

(21) Appl. No.: 16/396,019

(22) Filed: Apr. 26, 2019

(65) Prior Publication Data

US 2019/0332826 A1 Oct. 31, 2019

(30) Foreign Application Priority Data

Apr. 27, 2018 (FR) ...................................... 1853730

(51) Int. Cl.
*G06K 7/08* (2006.01)
*G06Q 20/20* (2012.01)

(52) U.S. Cl.
CPC ........... *G06K 7/087* (2013.01); *G06Q 20/204* (2013.01)

(58) Field of Classification Search
None
See application file for complete search history.

(56) References Cited

U.S. PATENT DOCUMENTS

| | | | | |
|---|---|---|---|---|
| 7,319,573 | B2* | 1/2008 | Nishiyama | G11B 5/4833 360/245.9 |
| 9,117,126 | B2* | 8/2015 | Manesh | G06K 7/084 |
| 9,449,204 | B1 | 9/2016 | Chen et al. | |
| 10,417,461 | B2* | 9/2019 | Rotsaert | G06K 7/0021 |
| 10,572,695 | B1* | 2/2020 | Guise | G06F 21/86 |
| 10,595,400 | B1* | 3/2020 | Razaghi | H05K 7/1427 |
| 2006/0250239 | A1* | 11/2006 | Melton | G06F 21/755 340/568.2 |
| 2008/0265032 | A1 | 10/2008 | Horiguchi et al. | |
| 2009/0302109 | A1* | 12/2009 | Kerner | G06K 7/0091 235/439 |

(Continued)

FOREIGN PATENT DOCUMENTS

EP 2824622 A2 1/2015

OTHER PUBLICATIONS

French Search Report and Written Opinion dated Feb. 15, 2019 for corresponding French Application No. 1853730, filed Apr. 27, 2018.

(Continued)

*Primary Examiner* — Oluseye Iwarere
(74) *Attorney, Agent, or Firm* — David D. Brush; Westman, Champlin & Koehler, P.A.

(57) ABSTRACT

A system for securing a magnetic card reader, including a surface-mounted magnetic reader head, via at least one mounting end, on a flexible printed circuit. The flexible printed circuit includes: at least one first layer for transporting analogue signals of the magnetic reader head; at least one layer having a plurality of tracks connected to the ground, called ground layer, covering the analogue signals of the first layer; and at least one dynamic security layer covering the ground layer.

11 Claims, 1 Drawing Sheet

(56) References Cited

U.S. PATENT DOCUMENTS

| | | | |
|---|---|---|---|
| 2011/0048756 A1* | 3/2011 | Shi | H05K 5/0208 174/50 |
| 2012/0235794 A1* | 9/2012 | Poidomani | G06K 19/077 340/10.1 |
| 2014/0263646 A1* | 9/2014 | Manesh | G06K 7/084 235/440 |
| 2014/0297540 A1* | 10/2014 | Swamy | G06Q 20/3272 705/71 |
| 2015/0097033 A1 | 4/2015 | Yanko et al. | |
| 2015/0161600 A1* | 6/2015 | Kahan | G06F 21/83 705/39 |
| 2016/0267299 A1* | 9/2016 | Yanko | G06K 7/065 |
| 2016/0350562 A1* | 12/2016 | Naccache | G06K 7/084 |
| 2018/0225484 A1* | 8/2018 | Rotsaert | G06K 7/0021 |
| 2019/0392416 A1* | 12/2019 | Bernholc | G06Q 20/327 |

OTHER PUBLICATIONS

English translation of Written Opinion dated Feb. 15, 2019 for corresponding French Application No. 1853730, filed Apr. 27, 2018.

* cited by examiner

SYSTEM FOR SECURING A MAGNETIC CARD READER, CORRESPONDING MAGNETIC CARD READER AND ELECTRONIC DEVICE

FIELD OF THE INVENTION

The present invention relates to the field of protecting magnetic card reader electronic devices. Such magnetic card reader devices are used in numerous appliances such as electronic payment terminals, authentication or identification devices or also content reader devices.

The present invention relates more specifically to securing such magnetic card reader devices, such that it is not possible to capture or monitor signals which are exchanged within these devices.

PRIOR ART

Appliances which integrate magnetic card reader devices, such as payment terminals, comprise numerous securing devices and implement numerous methods, making it possible to ensure that the appliances are used according to the uses for which they have been provided and respect security standards which are imposed by certification bodies.

For example, in the field of chip card electronic payment terminals, manufacturers are constrained to respecting the PCI PED (Payment Card Industry Pin Entry Device) standard in force. This security standard consists, in particular, of securing the keypad of the electronic payment terminals by protecting the entering of the confidential code, and of blocking the electronic payment terminal in case of intrusion (fraudulent or accidental).

To do this, systems are known which make it possible to protect electronic circuits, among which the devices of which the aim is to prevent reaching one or more given signals. Such systems are, for example, implemented in electronic payment terminals, in order to avoid reaching parts specifically identified inside these electronic payment terminals.

More specifically, for example, techniques are known which are particularly suitable for securing a non-SMC (Surface-Mounted Component) magnetic reading head, of which the through-hole mounting pads/ends (also called "Through-hole pads") are covered by folds of the flexible printed circuit (FPC). The advantage of this technique resides in protecting access to sensitive signals without requiring any complementary protective device. However, this technique has the main disadvantage of requiring a difficult and manual mounting process, due to the necessary presence of an interposer between the through-hole mounting ends and the fold of the FPC.

Also, techniques consisting of using a wiremesh are known, making it possible to defend an unauthorised access or boring of the printed circuit, in view of reaching a welding end, for example. Such a protection consists of introducing a type of mesh in the form of adjacent fine tracks covering all of the part to be protected. For example, one of the tracks can be connected to the supply and another to the ground. Consequently, a boring of this mesh can lead to the cutting of one or the other connection which will be detected, even a short circuit between the two tracks which will also be detected. Multiple variations of this device can be used. The detections can be made on voltage levels or on the conformity of signals travelling over these tracks.

However, using such a mesh leads to interferences with analogue signals of low amplitudes travelling in/over the printed circuit and the components thereof, like for example, the signals of a magnetic reader head.

Therefore, there is a need for a solution which offers a securing at least equal to the securing offered by these techniques of the prior art, while minimising or removing the disadvantages thereof, both concerning the mounting process and concerning the preserving of the integrity of the signals travelling in the circuit to be protected.

SUMMARY OF THE INVENTION

The technique proposed relates to a system for securing a magnetic card reader comprising a surface-mounted magnetic reader head, via at least one mounting end, on a flexible printed circuit, the flexible printed circuit comprising:
  at least one first layer for transporting analogue signals from the magnetic reader head;
  at least one layer comprising a plurality of tracks connected to the ground, called ground layer, covering the analogue signals from the first layer, and
  at least one dynamic security layer covering the ground layer.

Thus, the present technique proposes a novel and inventive solutions for securing a magnetic card reader, making it possible for a secure use of a magnetic reader head, surface-mounted on a flexible printed circuit, while guaranteeing the integrity of the analogue signals from the magnetic reader head.

To do this, the flexible printed circuit provides a ground layer covering the layer for transporting analogue signals from the reader head, so as to protect these signals from interferences generated by a dynamic security layer implemented, above the ground layer, to secure these analogue signals against malicious intrusions or spying attempts.

Thus, the potential negative effects of adding the dynamic security layer are compensated by adding a ground layer between this dynamic security layer and the layer for transporting analogue signals from the magnetic reader head.

According to a specific aspect of the technique proposed, the ground layer also covers at least one mounting end of the magnetic reader head on the flexible printed circuit.

According to this embodiment, the ground layer also protects the mounting ends of the magnetic reader head, surface-mounted on the secure flexible printed circuit. Protecting against potential interferences of the dynamic security layer therefore also extends to the mounting ends of the magnetic reader head.

According to a specific characteristic, the dynamic security layer comprises a mesh formed of a plurality of conductive tracks, the mesh generating a random digital signal.

According to this embodiment, the dynamic security layer corresponds to a mesh formed of adjacent fine tracks, arranged like a mesh, covering all of the surface to be protected, in this case, the layer for transporting analogue signals from the magnetic reader head and the mounting ends of the latter, covered beforehand with a ground layer, as described above.

In addition, the mesh is dynamic, i.e. that it generates a random digital signal, for example, a signal going from 2 volts to 0 volts, so as to "deceive" a possible spying device.

According to a specific aspect, at least one track connected to the ground is nested/embedded in the plurality of tracks of the mesh.

According to this embodiment, the dynamic mesh also comprises one or more tracks connected to the ground, in order to also absorb some of the disturbances due to the random digital signal generated by this mesh itself.

In this manner, the interferences of the dynamic security layer are absorbed both by the ground layer covering the layer for transporting this analogue data (and the mounting ends of the magnetic reader head) and by the ground nested/embedded in the dynamic security layer, offering a double protection against the interferences with the analogue data of low amplitude of the magnetic reader head.

Moreover, according to a specific characteristic of the technique proposed, the routing of said at least one nested/embedded ground track is implemented so as to absorb at least some of the interferences generated by the dynamic security layer.

According to this embodiment, it is the specific routing of the ground tracks nested/embedded in the tracks of the dynamic security layer which ensures this absorption of the interferences.

This routing depends, for example, on the routing of the analogue signals from the magnetic reader head.

According to another specific characteristic, the routing of the plurality of tracks of the ground layer is implemented so as to absorb at least some of the interferences generated by the dynamic security layer.

According to this embodiment, it is the specific routing of the tracks of the ground layer which ensures this absorption of the interferences.

This routing depends, for example, on the routing of the analogue signals from the magnetic reader head, the layer for transporting these signals being directly located under the ground layer.

In particular, the routings described above are suitable for the routing of the tracks of the transporting layer.

The present technique also relates to a magnetic card reader comprising a securing system such as described above, according to the different embodiments thereof.

The present technique also relates to an electronic device comprising a magnetic card reader such as described above, according to the different embodiments thereof. In particular, such a device corresponds to an electronic payment terminal.

FIGURES

Other characteristics and advantages of the invention will appear more clearly upon reading the following description of a preferred embodiment, given as a single illustrative and non-limiting example, and the appended drawings, among which:

DETAILED DESCRIPTION OF THE INVENTION

The general principle of an exemplary embodiment of the invention is based on the modification of the flexible printed circuit on which is surface-mounted a magnetic reader head to ensure the securing of this magnetic reader head, and therefore of the magnetic card reader, against possible attacks intended to spy on the data of this magnetic reader head (for example, sensitive data read from the magnetic card inserted in the magnetic card reader comprising confidential transaction data).

To do this, this modified flexible printed circuit comprises at least the three following layers:
  a layer for transporting analogue signals from the magnetic reader head;
  at least one dynamic security layer comprising a plurality of tracks in the form of a mesh generating a random digital signal, and
  at least one ground layer inserted between the transporting layer and the dynamic security layer.

Thus, rather than adding a specific electronic component which protects a predefined zone, the system proposed consists both:
  of using a magnetic reader head surface-mounted on a flexible printed circuit, making it possible to simplify, in particular, the architecture of the magnetic card reader, and
  of securing this magnetic reader head and the signals travelling in the flexible printed circuit on which it is mounted, thanks to a specific architecture of this flexible printed circuit itself.

This specific architecture is in particular illustrated, according to the specific embodiments of the invention, by FIGS. 1 and 2a to 2d described below. The present solution can be implemented in all electronic devices comprising a magnetic card reader and responding to security constraints, like for example electronic payment terminals, authentication or identification devices or also content reader devices.

Figure 1:
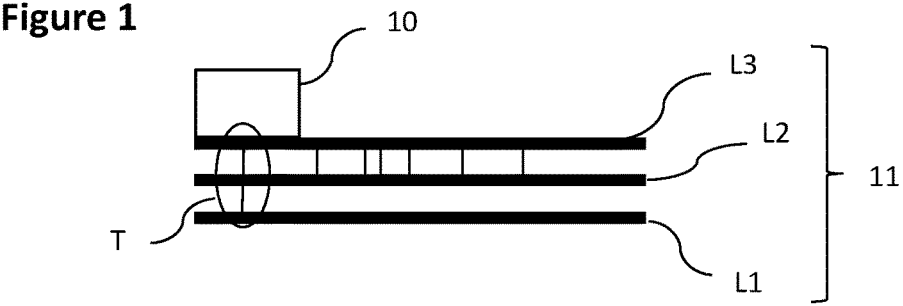
FIG. 1 illustrates an example of a securing system according to one embodiment of the invention.

According to one embodiment of the invention, illustrated for example in FIG. 1, the securing of the magnetic card reader is ensured by a dynamic security layer L3 composed of a mesh making it possible, not only of detecting any intrusion cutting the tracks thereof, but also of disturbing any attempt of spying data of the magnetic reader head by generating a random digital signal (for example, a signal going from 0 volts to 2 volts randomly).

This dynamic security layer L3 could lead to interferences with the signals from the magnetic reader head travelling over the layer L1, a ground layer L2, also called shielding, is inserted between the transporting layer L1 and the dynamic security layer L3, so as to absorb some of the interferences potentially generated by the dynamic security layer L3.

Finally, an additional shielding is ensured by the nesting/embedding of at least one track connected to the ground in the tracks of the mesh of the dynamic security layer L3.

The flexible printed circuit 11 on which is mounted the magnetic reader head 10, via one or more mounting ends T, therefore comprises at least these three couches L1, L2 and L3.

Thus, the proposed solution makes it possible, not only:
  to simplify the architecture of the magnetic card reader by using a magnetic reader head surface-mounted on a flexible printed circuit and therefore by avoiding the need to add a specific electronic component or by avoiding a specific mounting process;
  to ensure the security of the surface-mounted magnetic reader head thanks to a dynamic mesh, and to the nesting/embedding of the mesh itself with the ground;
  while reinforcing the preservation of the integrity of the low-amplitude analogue signals from the magnetic reader head by limiting the impact of the dynamic signal of the mesh, thanks to a ground layer inserted between the analogue signals and the mesh, and thanks to an nesting/embedding of the ground within the mesh itself.

It must be noted, that according to an embodiment making it possible to obtain an optimal efficacy, the (ground) layer L2 and (dynamic security) layer L3 cover, not only fully, the analogue signals from the magnetic reader head, but also the mounting ends T of the magnetic reader head on the secure flexible printed circuit.

To do this, the different layers are assembled during the manufacturing of the secure flexible printed circuit. Thus, the secure flexible printed circuit is already "pressed" with the different layers during the assembly on the magnetic reader head.

This embodiment is, for example, illustrated in FIGS. 2a to 2d, representing respectively the layers L1, L2 and L3, as well as the three superposed layers.

Figure 2A:
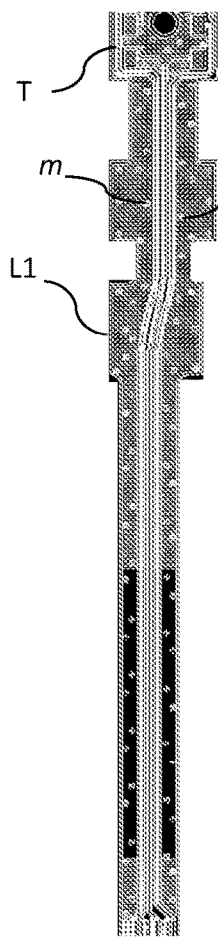
FIGS. 2a to 2d illustrate the different layers of the secure flexible printed circuit according to one embodiment of the invention.

More specifically, in FIG. 2a corresponding to the layer L1, the low part represents some of the tracks for transporting analogue signals from the magnetic reader head, while the high part represents a part of a mounting end T of the magnetic reader head, making it possible for the data to be read by the magnetic head to travel over the tracks described above, in view of them being processed by the other elements of the magnetic card reader and of the electronic device comprising this magnetic card reader. FIG. 2a illustrates an example of specific configuration of the tracks of the analogue signals from the magnetic reader head, configuration from which the ground layer L2 and dynamic security layer L3 are specified in view of both an optimal securing of these signals from the magnetic reader head and a maximum absorption of the interferences due to this securing by the layer L3.

Figure 2B:
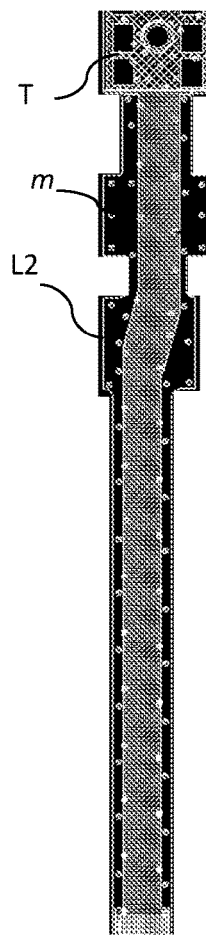

Thus, as illustrated in FIG. 2b representing the ground layer L2, the tracks connected to the ground are routed so as to fully cover the tracks of the layer L1, as well as the mounting end T of the magnetic reader head, illustrated on the high part of FIG. 2b. In this manner, all the analogue signals travelling from the magnetic reader head to the remainder of the magnetic card reader are protected from possible interferences generated, not only by the dynamic security layer L3, but also by other elements of the magnetic card reader or of the electronic device itself. Thus, it can actually be noted, that the ground tracks of this layer L2 follow the same design as the tracks for transporting the analogue signals from the magnetic reader head of the layer L1.

Figure 2C:
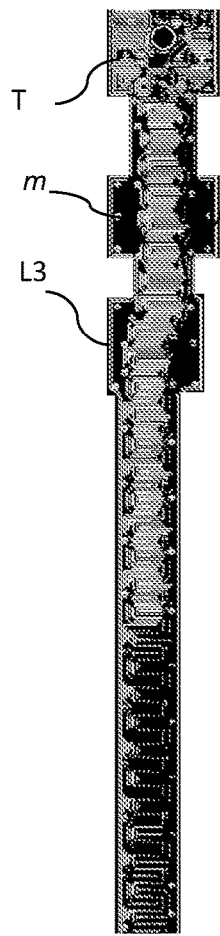

Finally, as illustrated in FIG. 2c, a third layer L3 is added, composed of a dynamic mesh, i.e. a plurality of tracks, generating a random signal. This dynamic security layer L3 also comprises tracks connected to the ground, for example via the different points m illustrated in FIGS. 2a to 2d, so as to reinforce the absorption of the interferences generated, in particular by the layer L3 itself. Even then, the tracks of the dynamic mesh and the nested/embedded ground tracks are routed so as to make it possible, not only for an optimal securing of the analogue signals of the layer L1, but also an optimal absorption of the possible interferences. Thus, it can actually be noted, that the tracks of this layer L3 also follow the same design as the tracks for transporting the analogue signals of the magnetic reader head of the layer L1. The mesh of this layer L3 also covers, according to this embodiment, the mounting ends T of the magnetic reader head.

Figure 2D:
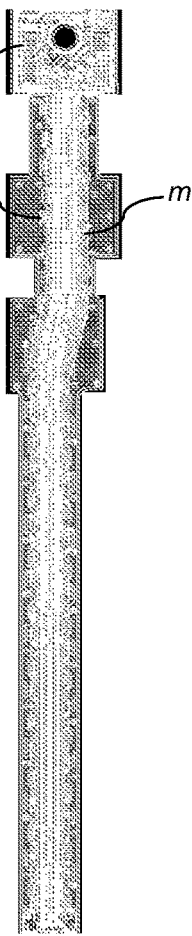

Finally, FIG. 2d illustrates these three superposed layers L1, L2 and L3, according to one embodiment of the securing system according to the invention. Likewise, as for FIGS. 2b and 2c, it can be noted that the overall design of these three superposed layers corresponds to that of the tracks for transporting the analogue signals from the magnetic reader head of the layer L1, such that these analogue signals are not only secured against external attacks thank to the dynamic mesh of the layer L3, but also protected from interferences, in particular generated by this layer L3, thanks to the layer L2 and to the ground nested/embedded in the layer L3.

Other architectures or designs of the tracks of the analogue signals from the magnetic reader head are possible of course, according to the architectural constraints of the magnetic card reader itself, or of the electronic device, and the routing of the tracks of the layers L2 and L3 are thus consequently suitable, so as to achieve the aim of securing and protecting against interferences.

The invention claimed is:

1. A securing system for securing a magnetic card reader comprising a surface-mounted magnetic reader head, via at least one mounting end, on a flexible printed circuit, said securing system comprising:
   said flexible printed circuit, which comprises:
   at least one first layer for transporting analogue signals from said magnetic reader head;
   at least one layer comprising a plurality of tracks connected to ground, called a ground layer, covering said analogue signals of said first layer; and
   at least one dynamic security layer covering said ground layer.

2. The securing system according to claim 1, wherein said ground layer also covers at least said mounting end of said magnetic reader head on said flexible printed circuit.

3. The securing system according to claim 1, wherein said dynamic security layer comprises a mesh formed of a plurality of conductive tracks, said mesh generating a random digital signal.

4. The securing system according to claim 3, wherein at least one track connected to the ground is nested in said plurality of tracks of said mesh.

5. The securing system according to claim 4, wherein routing of said at least one nested ground track is implemented so as to absorb at least some interferences generated by said dynamic security layer.

6. The securing system according to claim 1, wherein routing of said plurality of tracks of said ground layer is implemented so as to absorb at least some interferences generated by said dynamic security layer.

7. The securing system according to claim 5, wherein the routing is adapted to routing of the tracks of said transporting layer.

8. A magnetic card reader comprising a surface-mounted magnetic reader head and a securing system for securing said magnetic card reader, via at least one mounting end, on a flexible printed circuit, said securing system comprising:
   said flexible printed circuit, which comprises:
   at least one first layer for transporting analogue signals from said magnetic reader head;
   at least one layer comprising a plurality of tracks connected to ground, called a ground layer, covering said analogue signals of said first layer; and
   at least one dynamic security layer covering said ground layer.

9. The securing system according to claim 6, wherein the routing is adapted to routing of the tracks of said transporting layer.

10. An electronic payment terminal, comprising:
    a magnetic card reader comprising a surface-mounted magnetic reader head;
    and a securing system for securing said magnetic card reader, said securing system comprising:
    a flexible printed circuit comprising:
    at least one mounting end secured to the magnetic card reader;

at least one first layer for transporting analogue signals from said magnetic reader head;

at least one layer comprising a plurality of tracks connected to ground, called a ground layer, covering said analogue signals of said first layer; and at least one dynamic security layer covering said ground layer.

11. The securing system according to claim 1, wherein the at least one layer comprising the plurality of tracks connected to ground is positioned between the at least one first layer for transporting analogue signals and the at least one dynamic security layer covering said ground layer.

* * * * *